INVENTOR.
RAYMOND A. MACMILLAN
BY Wade Koontz Jr.
George Fine
ATTORNEYS

Aug. 23, 1966 R. A. MacMILLAN 3,268,823

COMPARISON CIRCUIT

Original Filed May 5, 1959 2 Sheets-Sheet 2

INVENTOR.
RAYMOND A. MACMILLAN
BY
Wade Koontz
George Fine
ATTORNEYS 3,268,823
COMPARISON CIRCUIT

Raymond A. MacMillan, Greenwood, Mass., assignor to the United States of America as represented by the Secretary of the Air Force
Original application May 5, 1959, Ser. No. 811,238, now Patent No. 3,130,362, dated Apr. 21, 1964. Divided and this application Nov. 5, 1963, Ser. No. 321,653
2 Claims. (Cl. 328—155)

The invention described herein may be manufactured and used by or for the United States Government for governmental purposes without payment to me of any royalty thereon.

This application is a division of my co-pending patent application bearing Serial Number 811,238 which was filed May 5, 1959, now Patent No. 3,130,362.

This invention relates to electrical apparatus, and more particularly to apparatus for comparing a pair of signals to each other and utilizing the resultant signal to maintain automatically and continuously equality of the pair of compared signals.

In many electrical applications, it is desirable to maintain automatically and continuously the gain of an amplifier at a preselected level in spite of the variations of frequency of the input signal thereto. For example, it may be advantageous to utilize a 90° amplifier so that the alternating current signal may be shifted in phase while retaining unity gain. In another instance, an alternating current amplifier may be utilized for purpose of impedance changing while retaining the gain thereof at unity in spite of wide frequency variations of the input signal.

One of the limitations in retaining unity gain in an amplifier exists in the comparison circuitry wherein it is necessary to compare the input A.C. signal to the output A.C. signal and to utilize the resultant signal to retain the gain of said amplifier at unity.

In accordance with the present invention, a unique comparison circuit is provided to produce a resultant signal to control a 90° amplifier so as to retain the gain thereof at unity. The 90° amplifier includes at the input thereof a variable resistor wherein the value thereof is varied by an applied direct current voltage so that the A.C. input signal to the 90° amplifier is adjusted in the correct direction so that it equals the A.C. output signal therefrom. The aforesaid comparison circuitry utilizes the input A.C. signal and the output A.C. signal of the 90° amplifier so as to produce a pair of D.C. voltages and then compares the pair to each other so as to provide a resultant A.C. signal only when there is a difference in potential therebetween. The resultant A.C. signal is then rectified to provide a D.C. control voltage applied to the aforementioned variable input resistor to vary it in the correct direction to maintain unity gain of the 90° amplifier in spite of variations in frequency of the input signal thereto.

An object of the present invention is to provide comparison circuitry for a pair of signals to produce a resultant signal only when a difference in potential exists between aforesaid pair.

Another object of the present invention is to provide a comparison circuit for the input and output signals of a 90° amplifier wherein the resultant signal from said comparison is utilized to maintain the gain of the 90° amplifier at unity.

Yet another object of the present invention is to provide comparison circuitry in which a pair of A.C. signals having differing phases are compared to each other to obtain a resultant D.C. signal.

Further objects, features and advantages of this invention will suggest themselves to those skilled in the art and will become apparent from the following description of the invention taken in connection with the accompanying drawings in which.

Figure 1:
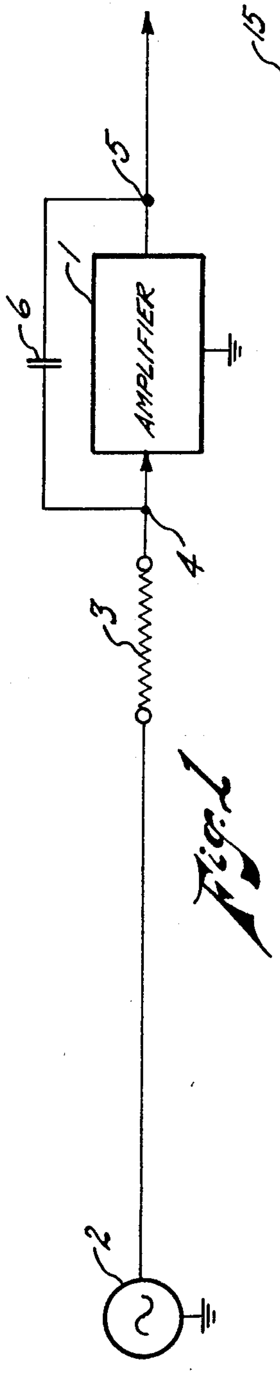
FIG. 1, is a block diagram of a conventional R-C feedback amplifier.

Reference is made now more particularly to FIG. 1 in which high gain amplifier 1 receives a signal from source 2 by way of input resistor 3. Signal source 2 has a varying frequency. Output terminal 5 is connected to input terminal 4 by way of capacitor 6. When the value of resistance 3 is made equal to the value of the capacitive reactance $X_c$ of capacitor 6 for any specific input frequency, the over-all gain G is unity and the phase angle of the output signal at terminal 5 is 90° with respect to the input signal from source 2. The error with aforegoing conditions would be $1/A$ radians where A is the open loop gain. When resistance 3 is not equally adjusted to the capacitive reactance, $X_c$, then the output signal from terminal 5 differs from the input signal. The gain, G, is also other than unity so that $G=X_c/\text{Resistance 3}$.

Conversely, when the input voltage is made equal to the output voltage for any input frequency, by adjusting resistance 3, $G=1$, resistance $3=X_c$, and the resulting phase angle of the output signal is 90° with negligible error. For example, with an amplifier voltage gain of 4000, the output voltage will have a 90° phase angle within an error of 0.01432°, 1 radian=57.3° or 1/4000=0.01432°.

Figure 2:
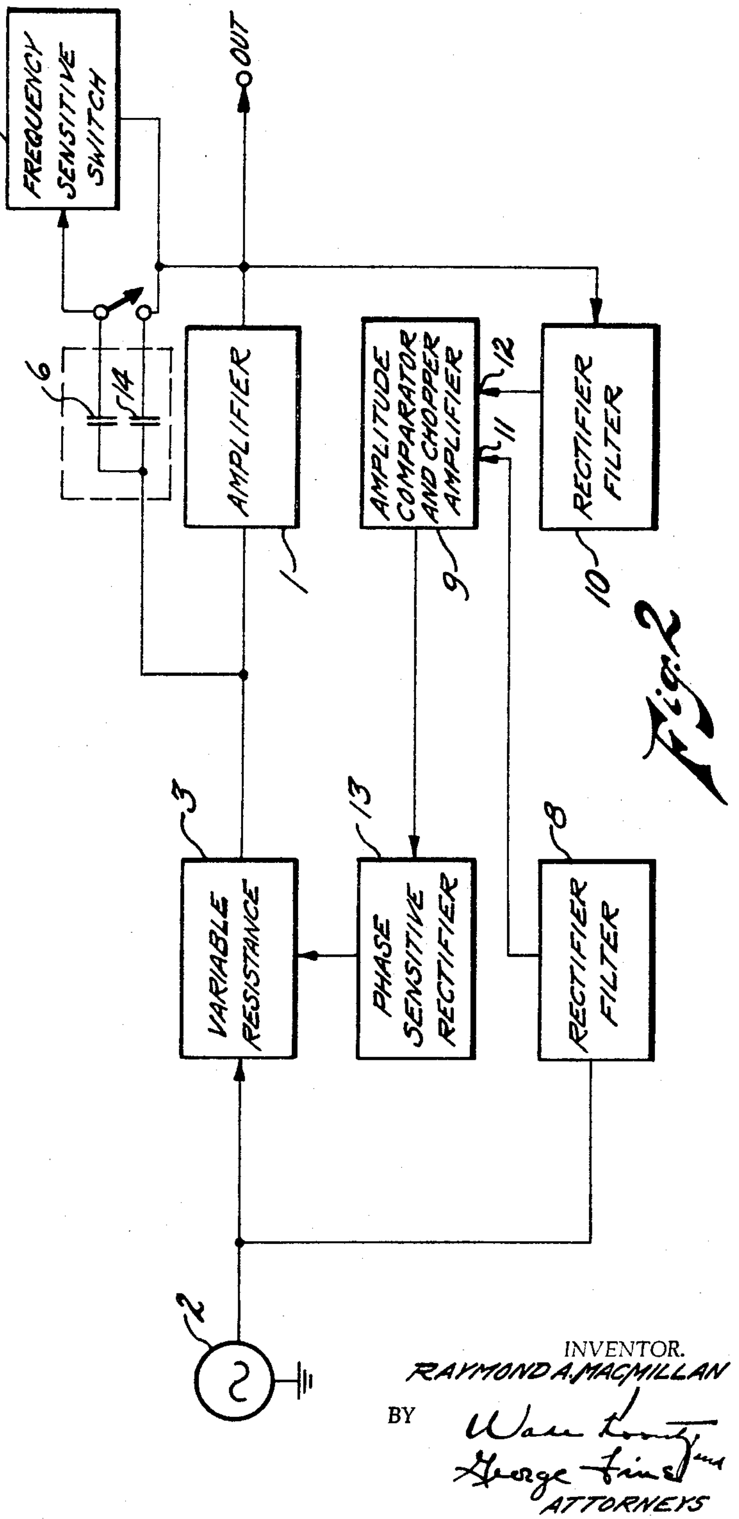
FIG. 2 is a block diagram illustrating one embodiment of the present invention.

Now referring to FIG. 2, a novel system is provided thereby so that for any specific frequency of input signal, E in, the value of a series input resistor to an amplifier is automatically made equal to the capacitive reactance of the feedback capacitor connected between the output terminal and input terminal of aforesaid amplifier. Furthermore, when the value of the input resistance is made equal to the capacitive reactance of the feedback capacitor, the amplitude of the output signal, E out, is equal to the amplitude of the input signal, E in, and the phase of the output signal is precisely 90° different than the input signal.

In the operation of the block diagram of FIG. 2, source 2 provides an A.C. signal of varying frequency which is fed to a varying resistance 3. Varying resistance 3 is described hereinafter in greater detail and it is a component whose resistance varies in accordance with a D.C. control voltage related to the input signal. Variable resistance 3 performs the same function as input resistor 3 of FIGURE 1. Variable resistance 3 provides a variable resistor for an A.C. signal which can be varied with a D.C. control voltage from a few hundred ohms to megohms. The A.C. signal from source 2 is also applied to rectifier filter 8 which produces a direct potential voltage to amplitude comparator 9 at point 11. Meanwhile an A.C. signal from variable resistor 3 is fed through amplifier 1 to rectifier filter 10 which then produces a D.C. voltage at point 12 of comparator 9. Comparator 9 has two D.C. signal inputs which it compares in amplitude. The output signal from comparator 9 is an A.C. signal. When the D.C. potentials are equal at points 11 and 12, then the output A.C. signal appears for comparator 9. However, if the potential at point 11 is more or less than the potential at point 12, the difference produces an A.C. output voltage from comparator 9. The amplitude of this voltage is proportional to the difference of the D.C. potentials at points 11 and 12. The A.C. signal from comparator 9 is fed to phase sensitive rectifier 13 which produces a D.C. control voltage fed to variable resistor 3. The aforesaid D.C. control voltage then changes variable resistance 3 in the right direction so that the D.C. potentials at points 11 and 12 are maintained equal, thus automatically maintaining the input signal, E in, and the output signal, E out, of amplifier 1 equal for any frequency.

In effect, the values of capacitive reactance, $X_c$, of capacitor 6 and resistance 3 form a voltage divider at the input amplifier 1. If the frequency of the input signal is lowered, $X_c$, increases in value and the amplifier receives less voltage consequently giving less output. The reverse is true if the frequency is raised. If now the value of resistor 3 is adjusted so that the output voltage equals the input voltage then $X_c$=resistor 3 and a 90° phase angle is assured, amplifier 2 having been previously adjusted for unity gain under this condition.

To cover a wide range feedback, capacitor 6 can have its value increased by automatically adding the parallel capacity 14 as the frequency of the input signal, E in, is lowered. This is accomplished by feeding the output signal, E out, from amplifier 1 to frequency sensitive switch 15 which will insert capacitor 14 in parallel with capacitor 6 in accordance with a frequency change. The frequency sensitive switch is explained in greater detail hereafter.

Figure 3:
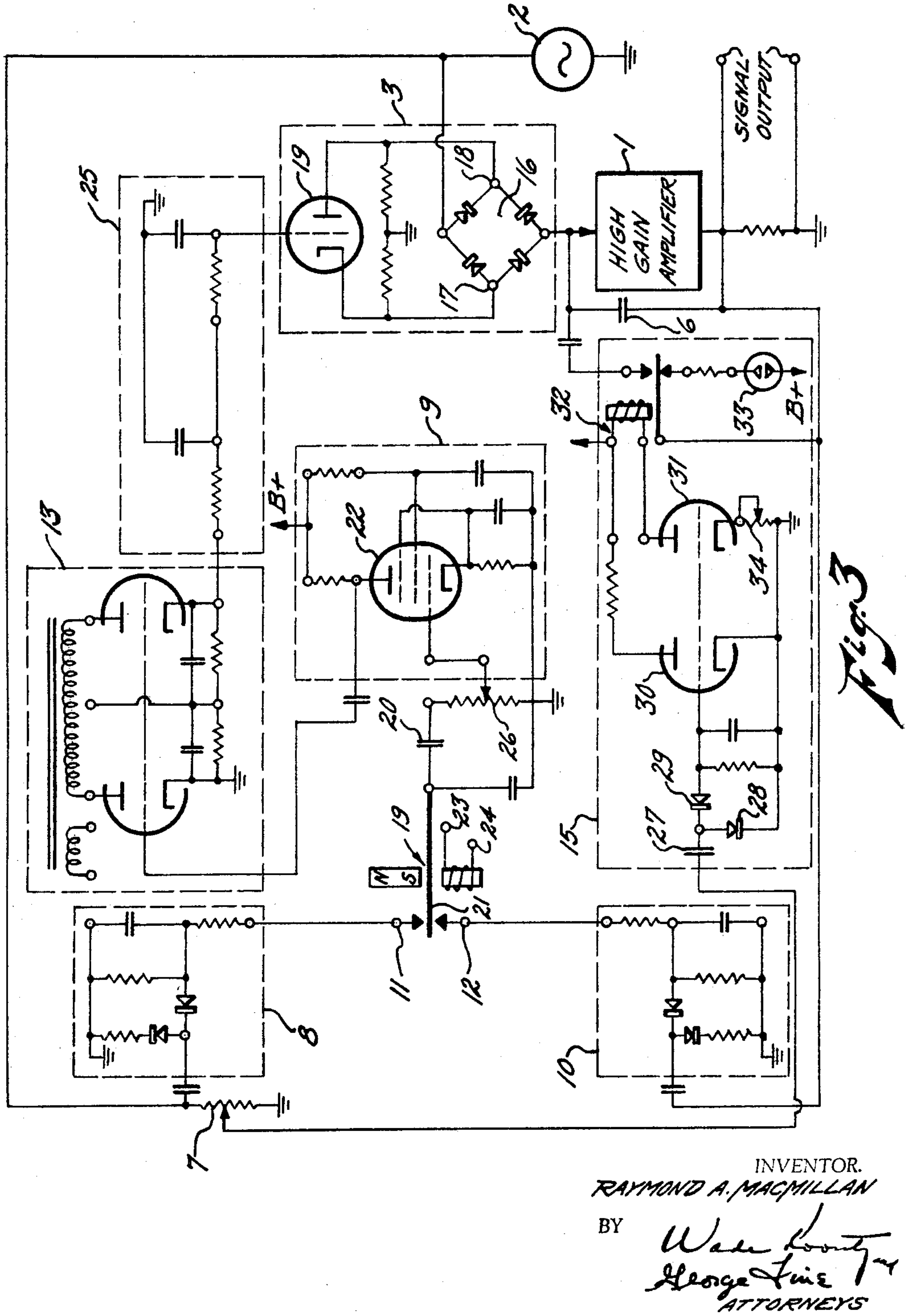
FIG. 3 is the schematic diagram of the block diagram of FIG. 2.

Now referring in detail to FIGURE 3, there is shown the schematic diagram of an embodiment of the present invention. Source 2 provides a signal whose frequency varies. The signal is fed to amplifier 1 by way of variable resistance 3. The apparent resistance of the full-wave bridge 16 to the impressed A.C. signal is a function of the resistance inserted in D.C. branch 17–18. The D.C. resistance is, in turn, determined by the resistance of electron discharge device 19. The resistance of electron discharge device 19 is determined by the potential applied to its control grid, the anode of the device is, of course, connected to the positive terminal of bridge 16 and its cathode is connected to the negative terminal of bridge 19 which controls the flow of D.C. The combination of electron discharge device 16 and full-wave rectifier 16 provides a variable resistor for A.C. signals which can be varied with a D.C. voltage from a few hundred ohms when the tube is conducting, to megohms when the tube is cut off. This aforesaid combination replaces input resistance 3 of FIGURE 1. A more detailed explanation of variable resistance 3 is supplied in my issued U.S. patent bearing the Serial No. 3,039,043, entitled Variable A.C. Transducer.

The A.C. signal which is applied to variable resistor 7 is also simultaneously applied to rectifier filter circuit 8 which provides a D.C. voltage to point 11 of amplitude comparator 9. The A.C. output signal from amplifier 1 is fed to rectifier filter 10 which supplies a D.C. voltage to point 12 of amplitude comparator 9. Points 11 and 12 are contacts for vibrator 19. If the D.C. voltages are equal at points 11 and 12, no change in the charge of coupling capacitor 20 occurs as vibrator arm 21 contacts each point. As a result, no alternating voltage appears at the output of comparator 9. However, if the potential at 11 is more or less than that at 12, the difference becomes chopped and the alternating voltage is amplified by the amplifier which incorporates tube 22. The phase angle of this voltage relative to the phase angle of the energizing voltage applied to terminals 23–24 of vibrator 19 had one of two possible values 0° or 180°. The phase of the vibrator drive voltage applied to terminals 23–24 is so chosen that the direct potential produced by phase sensitive rectifier 13 drives or changes variable resistor 3 in the right direction so that the D.C. voltages at points 11 and 12 are maintained at an equal value, thus automatically maintaining the input and output voltages of amplifier 2 equal for any frequency. Filter 25 controls the speed of response and damping of the servo loop and prevents spurious voltages appearing in the output of amplifier 2. Potentiometer 26 controls the gain, hunting or oscillation of the servo loop.

In order to cover a wide range, the value of capacitor 6 is automatically changed by adding or subtracting parallel capacity 14. This automatic increase or decrease of capacity is in response to a change of frequency of the input signal from source 1. The input signal from source 1 is applied to automatic switch 15 by way of capacitor 27 which is in series with rectifiers 28 and 29 and associated load resistors. These are provided for positive and negative halves of the cycle thus maintaining equal current flow for each half of the cycle. Alternating current flow in this circuit is mainly determined by the total circuit impedance of the resistance and capacitance. Due to the effect of capacitive reactance, the D.C. voltage appearing at the grid tube 30 will be a function of frequency and will increase as frequency increases. Relay 32 connected between the plates of twin triode tubes 30 and 31 in a bridge circuit and serves as a switch, adding capacitor 14 in parallel to capacitor 6 upon a change of frequency. Tubes 30 and 31 are self-biased and the position of potentiometer 34 determines the relative quiescent current in the relay coil. The circuit is so adjusted that relay 32 remains energized by quiescent current in tube 31 for all frequencies below a preselected frequency. Above the preselected frequency, the increasing positive voltage on the grid of tube 30 causes this tube to draw more current, reversing the current in the relay coil and allowing the armature to switch and change to total value of capacity. Due to the nature of the polarized relay, further increase in the positive voltage on the grid of tube 30 has no further effect. Neon indicator lamp 33 operated from one of the relay contacts 34 shows the operator which relay position is being used for any frequency.

While a particular embodiment of the invention has been shown and described, modifications may be made and it is intended in the appended claims to cover all such modifications as may fall within the true spirit and scope of my invention.

What is claimed is:

1. A comparison circuit for first and second alternating current signals operating to provide a resultant signal only when a difference in potential exists therebetween, said resultant signal being utilized in direct current form to retain the gain of a ninety degree amplifier at unity, comprising an alternating current signal source for said first alternating current signal, said source having a varying frequency, a ninety degree amplifier including a variable input resistor whose magnitude is varied in accordance with an applied direct current signal, said amplifier receiving said first alternating current signal by way of said variable input resistor, first means to rectify and filter said first alternating current signal to provide a first direct current signal, second means to rectify and filter the output signal from said amplifier to provide a second direct current signal, vibrator means having two input terminals and an arm vibrating therebetween, one of said terminals receiving said first direct current signal and the other, said second direct current signal, a capacitor circuit interconnecting said vibrator arm and alternating signal amplifying means, said capacitor circuit only charging with a difference in potential existing between said two input terminals, said difference in potential being chopped to provide an amplified alternating current signal, the amplitude thereof being proportional to said difference existing between said two input terminals, and third means to phase rectify said chopped, amplified alternating current signal to provide a third direct current signal for application to said variable input resistor.

2. A comparison circuit for first and second alternating current signals operating to provide a resultant signal only when a difference in potential exists therebetween, said resultant signal being utilized in direct current form to retain the gain of a ninety degree amplifier at unity, comprising an alternating current signal source for said first alternating current signal, said source having a varying frequency, a ninety degree amplifier including a variable input resistor whose magnitude is varied in accordance with an applied direct current signal, said amplifier receiving said first alternating current signal by way of said variable input resistor, means to initially adjust said ninety degree amplifier to ensure said first alternating signal be equal to the output signal therefrom, first means to rectify and filter said first alternating current signal to provide a first direct current signal, second means to rectify and filter said output signal from said amplifier to provide a second direct current signal, vibrator means having two input terminals, an arm vibrating therebetween, and an energizing source for said vibrating arm, said energizing source having a predetermined phase, one of said terminals receiving said first direct current signal and the other, said second direct current signal, a capacitor circuit interconnecting said vibrator arm and an alternating signal amplifying means, said capacitor circuit only charging with a difference in potential existing between said two input terminals, said difference in potential being chopped to provide an amplified alternating current signal, the amplitude thereof being proportional to said difference in potential existing between said two input terminals, and third means to phase rectify and filter said chopped, amplified alternating current signal to provide a direct current signal for application to said variable input resistor.

References Cited by the Examiner

UNITED STATES PATENTS 2,967,992 1/1961 Scholten ............ 323—66

ARTHUR GAUSS, *Primary Examiner.*

M. LEE, J. JORDAN, *Assistant Examiners.*